June 3, 1958
L. SCHUBERT
2,836,891
EXTENSION BRIDGE
Filed Sept. 13, 1955
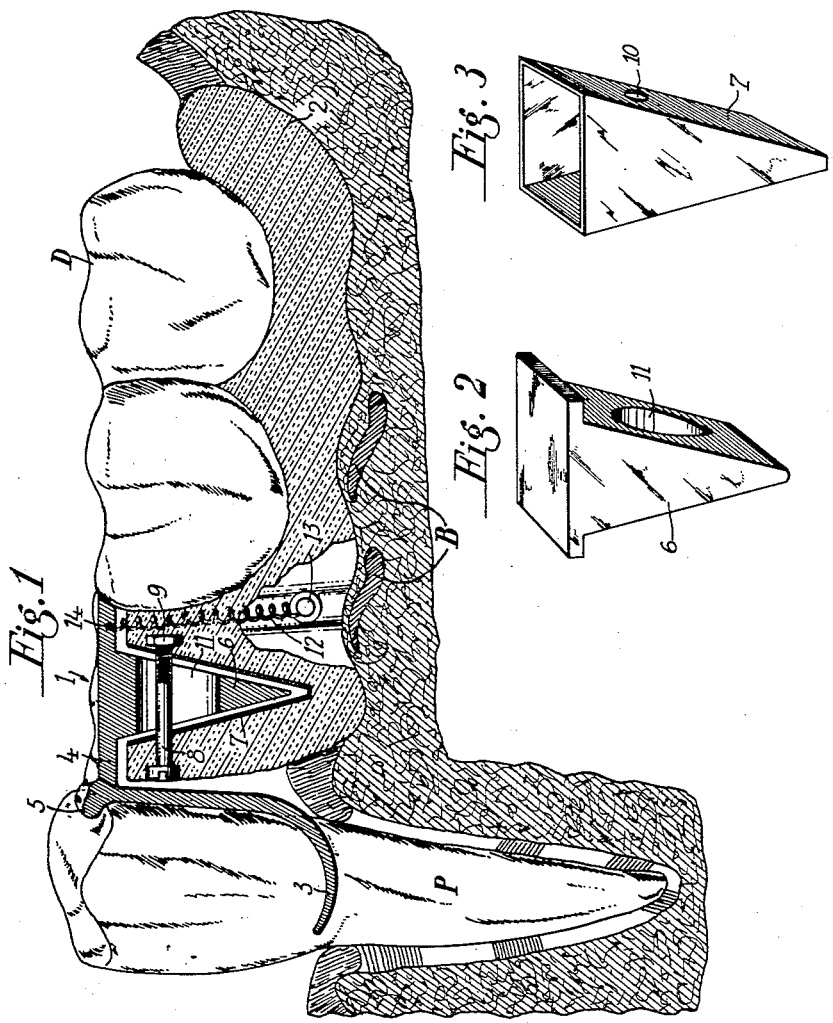
Inventor:
LEO SCHUBERT, DECEASED
BY ROSA SCHUBERT NEE ADLER,
LEGAL REPRESENTATIVE
by: J. Malthe-Seguy
Attorney

United States Patent Office 2,836,891
Patented June 3, 1958

2,836,891
EXTENSION BRIDGE

Leo Schubert, deceased, late of Paris, France, by Rosa Schubert, nee Adler, legal representative, Paris, France, assignor to Rosa Schubert, nee Adler, Marcel Maurice Schubert, and Andree Paulette Schubert, sole heirs Application September 13, 1955, Serial No. 535,211

Claims priority, application France September 14, 1954

3 Claims. (Cl. 32—5)

The present invention relates to attachment devices for attaching a dental prosthesis to support teeth, and more particularly to the case of a dental prosthesis mounted as an extension on one or several support teeth.

As is known, it is essential to avoid a continued pressure of the saddle of the prosthesis on the gum which causes a decalcification of the bone part of the jaw; but, on the other hand, it is no less essential, when a masticatory load is applied on the prosthesis, to avoid creation of a bending moment on the support tooth. It is indeed known that a tooth cannot and must not allow a linear extension which is greater than twice the value of the height of the crown. A simple extension bridge forms a lever which is very often very long and which is capable of exerting a leverage force on the support tooth which is out of proportion to the resistance of the root and its alveolus. Thus, if it is desired to support a prosthesis of a given size on a support tooth, it is essential to employ a yieldable device which may be termed a stress-breaker.

This device must be so constructed that it normally relieves, firstly, the support tooth and, secondly, the gum of the pressure exerted by the prosthesis, this device yielding elastically under the effect of mastication in such manner that substantially the whole of the masticatory load is borne by the alveolar arch and not by the support tooth. To this end, it has been suggested interposing between the fixed support attached to the supporting tooth and the movable member rigid with the saddle of the prosthesis, resilient members formed of rubber pads, springs or the like. This arrangement is disadvantageous in that these pads alter with time, subside and rapidly cease to fulfill their function efficiently, with the result that the masticatory load is transmitted to the support tooth and, moreover, the prosthesis is held separated from the gum in an unsatisfactory manner.

The object of the present invention is to provide an extension bridge which satisfies the requirements mentioned above without possessing the disadvantages of the abovementioned arrangements. This device comprises a female member in the form of a cone, pyramid or wedge, which is rigid with the saddle and who apex is directed toward the alveolar arch, a male member having a shape and dimensions to match those of the female member, said male member being rigid with a support which is fixed to the support tooth by any suitable means such as a clasp, ring or hook, the male member and the female member being traversed by a retaining screw unitary with the saddle and/or the female member but non-unitary with the fixed support, and the aperture formed in the male member for the passage of the screw being oval so as to permit a vertical displacement of the female member relative to the fixed support. The device may further comprise a coil spring the ends of which are fixed to said male and female members respectively, this spring being provided to bias the saddle in a direction to separate the latter from the alveolar arch and to apply the inner face of the female member against the outer face of the male member. As a result of this arrangement, during mastication, the spring is extended and the saddle bears against the gum and, when no force is applied on the saddle, the spring urges the latter such distance in such direction that the gum is relieved of the pressure exerted by the saddle. The strength of this spring is just sufficient for returning the saddle to a position in which it is spaced away from the gum, so that during mastication the load on the fixed support, which tends to exert a bending moment on the support tooth, is restricted to the force exerted by this spring and is in consequence very small. This device therefore satisfies both the requirements mentioned above.

Further features and advantages will appear from the ensuing description. In the accompanying drawing, which shows by way of example a dental prosthesis embodying the invention:

Fig. 1 is a sectional view of a dental prosthesis embodying the invention mounted on a support tooth, and Figs. 2 and 3 are perspective views on an enlarged scale of the conjugate male and female members forming part of this device.

In the embodiment shown in Fig. 1, a fixed support 1 is adapted to attach a dental prosthesis to a support tooth P. The dental prosthesis comprises, in the known manner, the saddle 2 which carries artificial teeth D and bears against the gingivomuscular flange B. The support 1 may be attached to the support tooth P by a hook or clasp 3 such as shown in Fig. 1, a Richmond ring or any other suitable fixing member of known type. This fixing element is rigid with the support 1 which comprises a plate 4, an occlusal rest 5 and a male connection member 6. These three parts may be cast or moulded in one piece or welded or soldered together, the unit being made of suitable materials, such as precious metals or their alloys, and other rustless materials used in prosthetic dentistry. The male member 6 (Fig. 2) has a generally conical, pyramidal or wedge-shaped form, the apex comprising a portion which is rounded or has a spherical or cylindrical curvature.

The tooth comprises, embedded therein, a female connection member 7 composed of a hollow piece (see Fig. 3) conjugate with the member 6, that is having an inner conical, pyramidal or wedge-shaped form. The member 7 has such dimensions that the member 6 is capable of freely entering therein without causing any wedging or adherence between the two members.

In the normal position of utilization, the members 6 and 7 interengage and form a non-rigid assembly between the support 1 and the saddle, as shown in Fig. 1. A loose connection is obtained between the members 6 and 7, i. e. between the support and the saddle, by means of a retaining screw 8 which may co-operate with nut 9 (although this is not essential). This screw extends through aligned apertures 10 and 11 formed in the members 7 and 6 respectively. The aperture 10 formed in the female member has such diameter as to accommodate the screw and the aperture 11 has a substantially elongated oval shape the major axis of which is vertically disposed and is greater than the diameter of the screw, so as to permit a vertical relative displacement of the two assembled members 6 and 7. The head of the screw and the nut (if used) are disposed in recesses formed in the moulded material of the prosthesis. A coil tension spring is fixed to the saddle at 13 and to the plate 4 at 14. This spring is under tension and may be disposed against the wall of the saddle on the side thereof adjacent the tongue, or in a recess formed in this wall or in a housing provided inside the saddle.

When at rest, that is when there is no load on the saddle, the female member 7 bears against the male member 6. The saddle then assumes such position that it is in contact with the alveolar arch but does not exert any harmful pressure on the mucous membrane of the gum.

When there is a masticatory load on the saddle, the two members 6 and 7 of the connection slightly disengage in a vertical direction in opposition to the action of the tension spring and the saddle undergoes a displacement determined by the elasticity of the mucous membrane, and bears against the alveolar arch. The entire masticatory load is substantially borne by the mucous membrane, the saddle being moved out of engagement with the anchorage formed by the metal support. When the masticatory load ceases, the action of the spring aided by the resilience of the mucous membrane returns the saddle to its position of rest.

If the support tooth has a second degree mobility, the spring may be omitted or eliminated which relieves the support tooth of all load, the return of the saddle to its position of rest being ensured solely by the effect of the resilience of the gingival mucous membrane.

There is thus obtained an extension bridge which is both simple and efficient and acts automatically and satisfactorily under the conditions required by physiodynamics. This device requires no preparation in the mouth and may be combined with hooks. Moreover, it may be combined with all methods of preparing support teeth, the dentist being free to decide the best solution to adopt for the anchorage in each particular case.

Although a specific embodiment of the invention has been described and shown, many changes or modifications may be made therein without departing from the scope of the invention as defined in the appended claims.

Having now described my invention what I claim as new and desire to secure by Letters Patent is:

1. In an extension bridge for use in prosthetic dentistry, the combination of a saddle, a female member molded into said saddle and having an inner face which tapers toward the alveolar arch of the mouth, a male member having a shape and dimensions substantially complementary to those of the female member, said shape and dimensions being such that no wedging engagement can occur between the surfaces of said male and female members, a support rigid with fixing means permitting the fixing of this support to a support tooth in the mouth of the user and, furthermore, rigid with the male member, the latter being disposed in the female member so that its taper is in the same direction as that of said female member, an aperture provided transversely of the tapering male member, a retaining screw held stationary with respect to the female member and disposed transversely of the latter, this screw extending through said aperture and having its head housed in a recess formed in the saddle, and said aperture having such size in the vertical direction as to permit the screw a limited free upward and downward displacement therein.

2. In an extension bridge for use in prosthetic dentistry, the combination of a saddle, a female member rigid with the latter and having an inner face which tapers toward the alveolar arch of the mouth, a male member having a shape and dimensions substantially complementary to those of the female member, a support rigid with fixing means permitting the fixing of this support to a support tooth in the mouth of the user and furthermore rigid with the male member, the latter being disposed in the female member so that its taper is in the same direction as that of said female member, an aperture provided transversely of the tapering male member, a retaining member held stationary with respect to the female member and disposed transversely of the latter, this retaining member extending through said aperture, and the latter having such size in the vertical direction as to permit the retaining member a limited free upward and downward displacement therein, spring means disposed between and connected to members rigid with the female and male members and adapted to urge the inner face of the female member against the outer face of the male member.

3. The combination as claimed in claim 2, wherein the spring means comprise an extension spring attached at one end to the saddle and at the other end to the support.

References Cited in the file of this patent
UNITED STATES PATENTS

| | | |
|---|---|---|
| 1,522,233 | Feinberg | Jan. 6, 1925 |
| 1,526,129 | Fortunati | Feb. 10, 1925 |
| 1,693,845 | Kellner et al. | Dec. 4, 1928 |